(12) United States Patent
Kaida et al.

(10) Patent No.: US 10,395,689 B2
(45) Date of Patent: Aug. 27, 2019

(54) OPTICAL DISC APPARATUS

(71) Applicant: Panasonic Intellectual Property Management Co., Ltd., Osaka (JP)

(72) Inventors: Masaru Kaida, Osaka (JP); Motoshi Ito, Osaka (JP); Daisuke Shimoda, Osaka (JP); Naohiro Kimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/902,449

(22) Filed: Feb. 22, 2018

(65) Prior Publication Data

US 2018/0254062 A1 Sep. 6, 2018

(30) Foreign Application Priority Data

Mar. 1, 2017 (JP) ................................. 2017-038340
Feb. 16, 2018 (JP) ................................. 2018-025598

(51) Int. Cl.
*G11B 7/00* (2006.01)
*G11B 17/22* (2006.01)
*G11B 7/085* (2006.01)
*G11B 20/18* (2006.01)
*G11B 23/03* (2006.01)
*G11B 27/00* (2006.01)
*G11B 7/09* (2006.01)

(52) U.S. Cl.
CPC ........ *G11B 17/228* (2013.01); *G11B 7/08517* (2013.01); *G11B 17/225* (2013.01); *G11B 17/226* (2013.01); *G11B 20/18* (2013.01); *G11B 23/0323* (2013.01); *G11B 23/0328* (2013.01); *G11B 27/002* (2013.01); *G11B 7/0948* (2013.01); *G11B 20/1889* (2013.01); *G11B 2220/20* (2013.01); *G11B 2220/40* (2013.01)

(58) Field of Classification Search
None
See application file for complete search history.

(56) References Cited

U.S. PATENT DOCUMENTS

| | | | | |
|---|---|---|---|---|
| 5,235,585 A | * | 8/1993 | Bish | G11B 20/1833 369/53.17 |
| 5,793,714 A | * | 8/1998 | Inoue | G11B 17/221 369/30.34 |
| 5,841,743 A | * | 11/1998 | Kobayashi | G11B 17/10 369/30.3 |
| 6,795,383 B1 | * | 9/2004 | Yamamoto | G11B 20/10527 369/275.3 |

(Continued)

FOREIGN PATENT DOCUMENTS

| | | |
|---|---|---|
| JP | 8-63895 | 3/1996 |
| JP | 10-27448 | 1/1998 |

(Continued)

*Primary Examiner* — Peter Vincent Agustin
(74) *Attorney, Agent, or Firm* — Wenderoth, Lind & Ponack, L.L.P.

(57) ABSTRACT

An optical disc apparatus includes: a controller configured to acquire information of an access result and access positions on an optical disc when an optical disc drive unit configured to optically access an optical disc optically accesses the optical disc; and a storage configured to store the information acquired by the controller.

7 Claims, 7 Drawing Sheets

| | A Surface L0 Layer | A Surface L1 Layer | A Surface L2 Layer | B Surface L0 Layer | B Surface L1 Layer | B Surface L2 Layer |
|---|---|---|---|---|---|---|
| No1 Optical Disc | ○ | ○ | ○ | ○ | ○ | ○ |
| No2 Optical Disc | ○ | ○ | ○ | ○ | ○ | ○ |
| | | | | | | |
| No12 Optical Disc | ○ | ○ | ○ | ○ | ○ | ○ |

(56) References Cited

U.S. PATENT DOCUMENTS

| | | | | |
|---|---|---|---|---|
| 7,215,619 | B1* | 5/2007 | Van Den Enden | G11B 7/00375 369/44.33 |
| 8,116,020 | B1* | 2/2012 | Lee | G11B 20/1883 360/31 |
| 2005/0162991 | A1* | 7/2005 | Matsuura | G11B 17/225 369/30.27 |
| 2008/0175124 | A1* | 7/2008 | Kikukawa | G11B 20/1883 369/94 |
| 2016/0155463 | A1* | 6/2016 | Takahashi | G11B 27/10 720/652 |
| 2017/0097789 | A1* | 4/2017 | Takasu | G06F 3/0631 |
| 2018/0102139 | A1* | 4/2018 | Miyashita | G11B 20/1816 |

FOREIGN PATENT DOCUMENTS

| | | |
|---|---|---|
| JP | 2003-36613 | 2/2003 |
| JP | 2003-505811 | 2/2003 |
| JP | 2008-234695 | 10/2008 |
| JP | 2008-262624 | 10/2008 |
| WO | 01/06510 | 1/2001 |

* cited by examiner

FIG. 6

| | Type of Information | Remark |
|---|---|---|
| 501 | Information Acquisition Date | Date When Following Data Has Been Acquired |
| 502 | Optical Disc Apparatus Identifier | Product Number, Serial Number, etc. of Optical Disc Appatatus |
| 503 | Magazine Type | Product Number, etc. of Magazine |
| 504 | Magazine Identifier | Serial Number, etc. of Magazine |
| 505 | Magazine Storage Position | Position of Magazine Stocker in Which Magazine Is Stored |
| 506 | Number of Optical Discs | Number of Optical Discs Held by Magazine |
| | No1 Optical Disc | |
| 507 | Optical Disc Type | Product Number, etc. of Optical Disc |
| 508 | Optical Disc Identifier | Serial Number, etc. of Optical DIsc |
| 509 | Inserted Drive Identifier | Identifier of Optical Disc Drive Unit into Which Optical Disc Has Been Inserted |
| 510 | Number of Defects | Number of Detected Defects |
| 511 | Alternative Area Residual Quantity | |
| 512 | No1 Defect Position (DP) (Physical) | (Track Position, Sector Position, Size) |
| 513 | No1 Defect Position (DP) (Logical) | (Address Number, Size) |
| 514 | No2 DP (Physical) | |
| 515 | No2 DP (Logical) | |

| | | |
|---|---|---|
| 516 | NoY DP (Physical) | |
| 517 | NoY DP (Logical) | |
| | No2 Optical Disc | |
| | Optical Disc Type | Product Number, etc. of Optical Disc |
| | Optical Disc Identifier | Serial Number, etc. of Optical DIsc |
| | Inserted Drive Identifier | Identifier of Optical Disc Drive Unit into Which Optical Disc Has Been Inserted |
| | Number of Defects | Number of Detected Defects |
| | Alternative Area Residual Quantity | |
| | No1 DP (Physical) | (Track Position, Sector Position, Size) |
| | No1 DP (Logical) | (Address Number, Size) |

FIG. 7

| | Type of Information | Remark |
|---|---|---|
| 501 | Information Acquisiton Date | Date When Following Data Has Been Acquired |
| 507 | Optical Disc Type | Product Number, etc. of Optical Disc |
| 508 | Optical Disc Identifier | Serial Number, etc. of Optical Disc |
| 502 | Optical Disc Apparatus Identifier | Product Number, Serial Number, etc. of Optical Disc Apparatus |
| 605 | Optical Disc Storage Position | Position of Magazine in Which Optical Disc Is Stored, Position of Magazine Stocker in Which Magazine Is Stored, etc. |
| 509 | Inserted Drive Identifier | Identifier of Optical Disc Drive Unit into Which Optical Disc Has Been Inserted |
| 512 | No1 DP (Physical) | (Physical Address) |
| 513 | No1 DP (Logical) | (Logical Address) |
| | No2 DP (Physical) | |
| | No2 DP (Logical) | |

| | | |
|---|---|---|
| 516 | NoY PD (Physical) | |
| 517 | NoY PD (Logical) | |

FIG. 8

| | A Surface L0 Layer | A Surface L1 Layer | A Surface L2 Layer | B Surface L0 Layer | B Surface L1 Layer | B Surface L2 Layer |
|---|---|---|---|---|---|---|
| No1 Optical Disc | ◯ | ◯ | ◯ | ◯ | ◯ | ◯ |
| No2 Optical Disc | ◯ | ◯ | ◯ | ◯ | ◯ | ◯ |
| | | | | | | |
| No12 Optical Disc | ◯ | ◯ | ◯ | ◯ | ◯ | ◯ |

OPTICAL DISC APPARATUS

BACKGROUND

1. Technical Field

The present disclosure relates to an optical disc apparatus that records information on an optical disc.

2. Description of the Related Art

Recording of information on an optical disc and reading of the information from the optical disc are generally performed by using an optical disc apparatus. When there is dust, a scratch, etc. on an information recording surface of the optical disc at that time, writing or reading of the information may not be performed normally.

PTL 1 to PTL 3 each disclose a technique that clearly displays a position or a shape of dust, a scratch, etc. on a recording surface of an optical disc.

CITATION LIST

Patent Literature

PTL 1: Unexamined Japanese Patent Publication No. 2008-262624

PTL 2: Unexamined Japanese Patent Publication No. 2008-234695

PTL 3: Unexamined Japanese Patent Publication No. H10-027448

SUMMARY

In the above-described literatures, a problematic optical disc is analyzed by obtaining the optical disc, and a shape of dust, a scratch, etc. on a recording surface can be clearly displayed.

However, an optical disc serving as an analysis object is not necessarily obtainable in an aspect of industrial application. For example, it is considered that an analyst serving as a third party is not provided with an optical disc because of confidentiality of information recorded on the optical disc.

In consideration of the above-described problem, an object of the present disclosure is to obtain information about a state, etc. of an individual optical disc, even when the optical disc serving as a recording medium cannot be directly obtained.

An optical disc apparatus according to one aspect of the present disclosure includes: a controller configured to acquire information of an access result indicating a result of an optical access by an optical disc drive unit to an optical disc and information of an access position indicating a position of the optical access on the optical disc; and a storage configured to store the information acquired by the controller.

According to the one aspect of the present disclosure, even when the optical disc serving as an analysis object cannot be obtained, it is possible to obtain information about a state, etc. of the optical disc.

BRIEF DESCRIPTION OF THE DRAWINGS

FIG. 6 is a table illustrating an information example held in a storage;

FIG. 7 is a table illustrating a connection example between the optical disc apparatus and an analysis device; and FIG. 8 is a table illustrating an output example displayed by the analysis device.

DETAILED DESCRIPTION

Hereinafter, an exemplary embodiment will be described in detail with reference to the drawings as appropriate. However, unnecessarily detailed description may be omitted. For example, detailed description of a well-known matter or repetitive description of substantially the same configuration is omitted in some cases. This is for avoiding unnecessary redundancy of the following description and facilitating understanding of those skilled in the art.

The inventor(s) of the present disclosure provide(s) the accompanying drawings and the following descriptions to help those skilled in the art to fully understand the present disclosure and thus do not intend to limit the subject matter defined in the appended claims.

(First exemplary embodiment)

Figure 1:
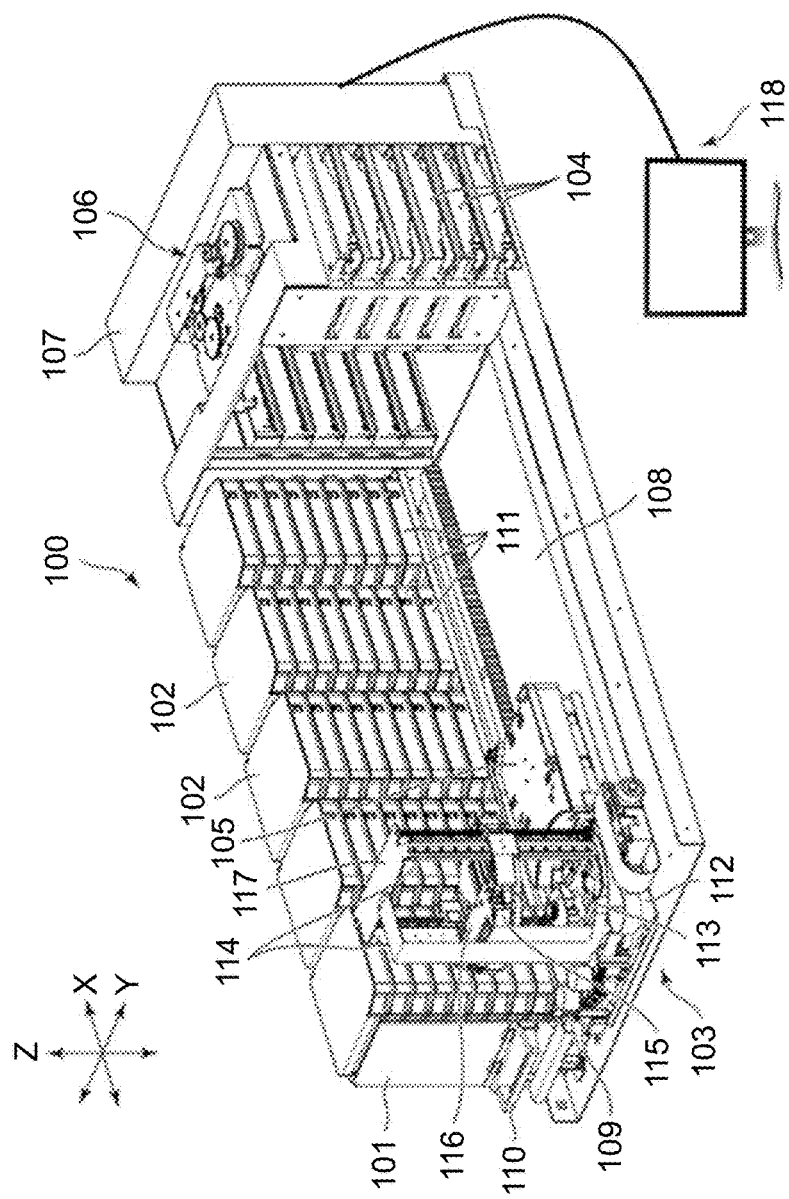
FIG. 1 is a view illustrating a configuration of an optical disc apparatus.

FIG. 1 is a view illustrating a configuration of an optical disc apparatus. Note that in the present exemplary embodiment, a lower left side in FIG. 1 is referred to as an "apparatus front side", and an upper right side in FIG. 1 is referred to as an "apparatus rear side".

Optical disc apparatus 100 according to the present exemplary embodiment includes two magazine stockers 101. Two magazine stockers 101 are provided on bottom chassis 108 so as to face each other in apparatus width direction Y. It should be noted that illustration of one (near side) magazine stocker 101 is omitted in FIG. 1. Further, illustration of a top plate and a partition plate of magazine stocker 101 is omitted in FIG. 1.

Each magazine stocker 101 houses a plurality of magazines 102. Each magazine 102 has magazine tray 111 that houses a plurality of (for example, 12) optical discs. Picker 103 is provided between two magazine stockers 101. Picker 103 draws out magazine tray 111 from one magazine 102 selected from among the plurality of magazines 102 and holds magazine tray 111.

Picker 103 conveys held magazine tray 111 to vicinity of a plurality of optical disc drive units 104 disposed on the apparatus rear side. Picker 103 is integrally provided with lifter 105 that pushes out the plurality of optical discs from magazine tray 111.

Optical disc drive unit 104 is a device that records or reproduces information on or from the optical disc. Further, optical disc drive unit 104 is a tray type optical disc drive unit that loads the optical disc by using a tray. The plurality of optical disc drive units 104 are stacked in apparatus height direction Z and are disposed adjacent to each of magazine stockers 101 on the apparatus rear side. Carrier 106 is provided between the plurality of optical disc drive units 104 stacked and disposed adjacent to one magazine stocker 101 and the plurality of optical disc drive units 104 stacked and disposed adjacent to other magazine stocker 101.

In the example in FIG. 1, it is described below that optical disc apparatus 100 includes 6 optical disc drive units 104 on each side and includes 12 optical disc drive units 104 as a whole.

Carrier 106 holds the plurality of optical discs pushed out by lifter 105 in a stacked state, separates one optical disc from the plurality of held optical discs above the tray ejected from certain optical disc drive unit 104, and places the one separated optical disc on the tray.

Figure 2:
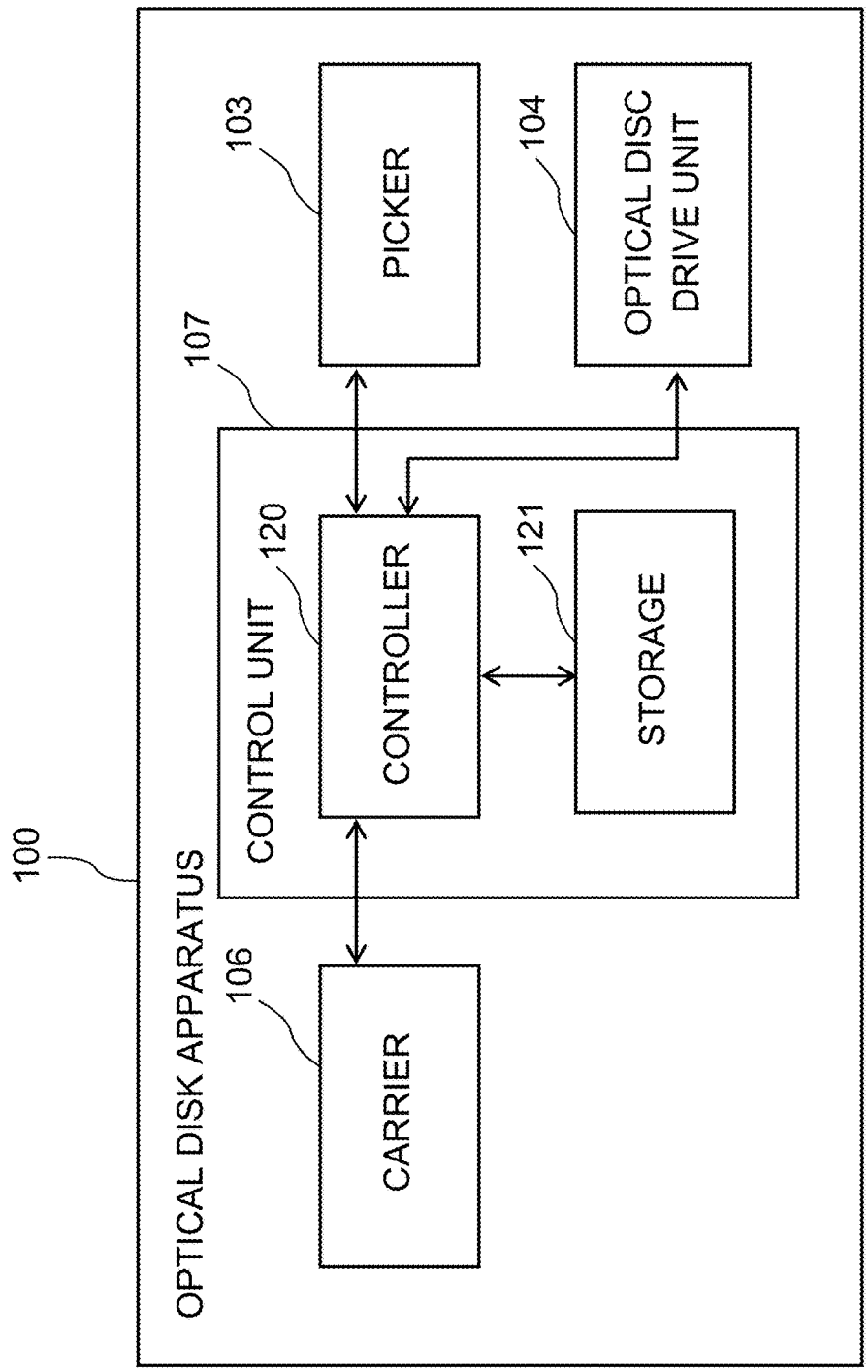
FIG. 2 is a block diagram of a control unit in the optical disc apparatus.

Control unit 107 is provided further on the apparatus rear side of carrier 106 and the plurality of optical disc drive units 104. FIG. 2 is a block diagram of control unit 107 in optical disc apparatus 100. Control unit 107 includes a power source (not illustrated) and controller 120 that controls operation (operation of a motor or the like) of each device, such as picker 103, optical disc drive unit 104, or carrier 106. Controller 120 includes a central processing unit (CPU) or a microprocessor unit (MPU) and executes a control program to achieve a predetermined function. Control unit 107 further includes storage 121 that holds various information. Storage 121 is realized by a volatile or nonvolatile memory or a recording module, such as a hard disk drive (HDD).

Optical disc drive unit 104 detects dust, a scratch, etc. of the optical disc. Controller 120 acquires information about the dust, scratch, etc. of the optical disc from optical disc drive unit 104 and provides the information to storage 121 to hold the information.

For example, control unit 107 is connected to a host computer that manages data or an optical disc analysis device to be described in the present exemplary embodiment. Based on an instruction from an operator, the host computer sends a command for control unit 107 to perform operation, such as writing or reading of data to or from specified magazine 102. The analysis device analyzes the dust, scratch, etc. on a recording surface or the like of the optical disc based on the information collected from optical disc apparatus 100, and clearly displays a state of the dust, scratch, etc. Control unit 107 controls operation of each device, such as picker 103, optical disc drive unit 104, or carrier 106, according to a command from the host computer, the analysis device, etc.

Magazine stocker 101 is provided along guide rail 109 that slidably guides picker 103. Guide rail 109 is provided so as to extend in an apparatus length direction X (a longitudinal direction of magazine stocker 101). Handle 110 is provided on a side surface on the apparatus front side of magazine stocker 101. Magazine stocker 101 can be moved in an apparatus front direction by pulling handle 110. Each magazine stocker 101 includes partition plates (not illustrated) formed in a grid shape, as viewed from apparatus width direction Y. Magazine 102 is housed in each space surrounded by the partition plates.

Picker 103 includes traveling base 112. A cart (not illustrated) that slidably moves on guide rail 109 is mounted on one magazine stocker 101 side of traveling base 112. Further, a roller (not illustrated) is mounted on other magazine stocker 101 side of traveling base 112.

Rotating base 113 is provided with a pair of lifting rails 114 so as to extend in apparatus height direction Z and face each other. Lifting base 115 is provided between the pair of lifting rails 114. Further, rotating base 113 is provided with a lifting base motor (not illustrated) that generates driving force to lift lifting base 115.

Lifting base 115 is provided with chuck 116. Chuck 116 has a mechanism for opening and closing a pair of hooks (not illustrated) engageable with an engagement recess of magazine tray 111 and moves the mechanism forward and rearward. The pair of lifting rails 114 is mounted on both side surfaces of U-shaped angle steel 117.

Input/output device 118 is an interface that allows a user of optical disc apparatus 100 to instruct to optical disc apparatus 100 or to confirm an output from optical disc apparatus 100. Specifically, a keyboard or a mouse is indicated as a typical example of the device to instruct to optical disc apparatus 100, and a display, etc. is indicated as a typical example of the device to confirm the output from optical disc apparatus 100.

In the present exemplary embodiment, the user does not specify the device as long as the device functions as the interface to optical disc apparatus 100. The user may use a device other than the device illustrated above. The device to instruct to optical disc apparatus 100 can be regarded as an input unit. Further, the device to confirm the output from optical disc apparatus 100 can be regarded as a display unit.

In a specific example described above, the optical disc is conveyed from magazine 102 stored in magazine stocker 101 to optical disc drive unit 104 by using picker 103, lifter 105, carrier 106, guide rail 109, traveling base 112, rotating base 113, lifting rail 114, lifting base 115, chuck 116, etc. However, a content of the present disclosure is not limited to this example. The optical disc may be conveyed from magazine 102 to optical disc drive unit 104 in other ways.

Figure 3:
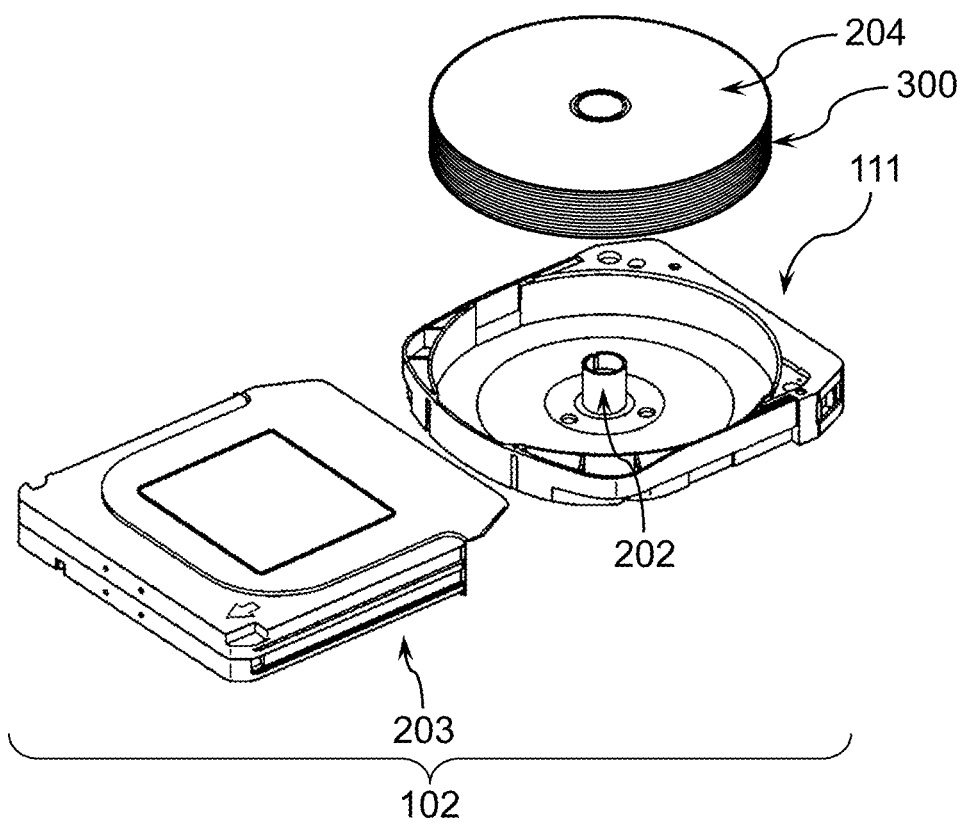
FIG. 3 is a view illustrating a configuration of a magazine.

FIG. 3 is a view illustrating a configuration of magazine 102. A plurality of optical discs 300 are stacked on each other in a thickness direction to form stacked optical discs 204. The stacked optical discs 204 are stored in magazine tray 111. A number of optical discs 300 to be stacked may be any number. Magazine tray 111 has core rod 202 inserted into a center hole of the stacked optical discs 204. Core rod 202 holds the stacked optical discs 204 and suppresses movement of optical discs 300 in a direction parallel to the surface of optical disc 300. Magazine tray 111 holding the stacked optical discs 204 is housed in tray holder 203. Magazine 102 includes both magazine tray 111 and tray holder 203.

Figure 4:
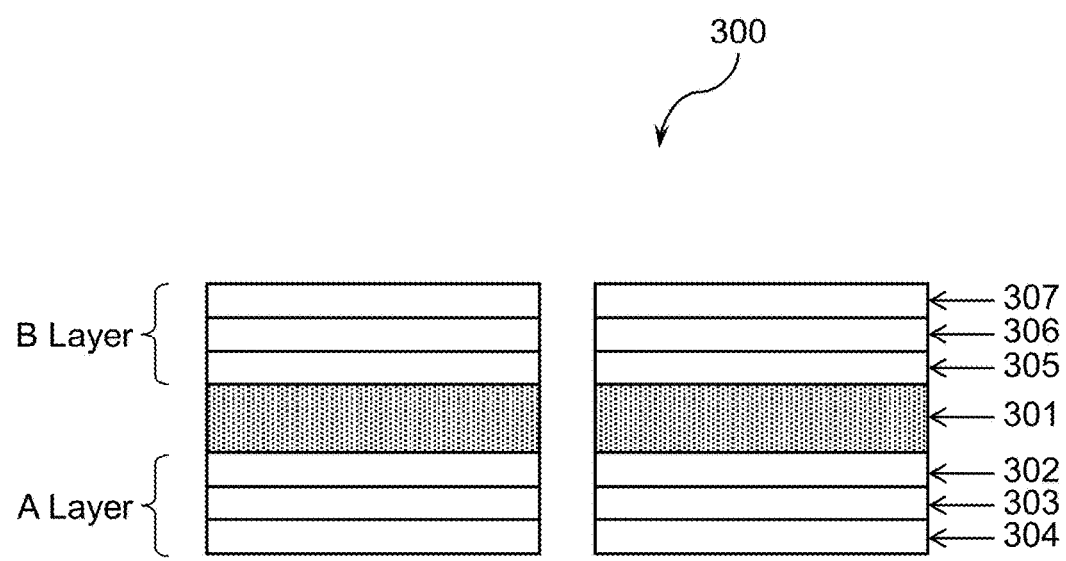
FIG. 4 is a view illustrating configuration layers of an optical disc.

FIG. 4 is a view illustrating configuration layers of optical disc 300. Optical disc 300 includes three main layers, that is, substrate layer 301, a recording layer on an A surface side, and a recording layer on a B surface side. Substrate layer 301 is a layer to become a basis of optical disc 300. Substrate layer 301 secures mechanical strength of entire optical disc 300 and supports the recording layers on the A surface side and the B surface side.

Both the recording layer on the A surface side and the recording layer on the B surface side are recording layers that record information in optical disc 300. The recording layer on the A surface side and the recording layer on the B surface side each have three recording layers. There are L0 layer 302, L1 layer 303, and L2 layer 304 from substrate layer 301 on the A surface side. Similarly, there are L0 layer 305, L1 layer 306, and L2 layer 307 from substrate layer 301 on the B surface side.

A case where the recording layers on the A surface side and the B surface side each hold the three recording layers is illustrated in the present exemplary embodiment. However, the content of the present disclosure is not limited to this case. The recording layers on the A surface side and the B surface side may have four or more recording layers or two or less recording layers. Further, a case where optical disc 300 has the recording layers on both the A surface side and the B surface side is illustrated in the above description. However, the content of the present disclosure is not limited to this case. Optical disc 300 may have recording layers only on one side. Furthermore, a number of recording layers on the A surface side and a number of recording layers on the B surface side may be different.

Note that the terms "A surface" and "B surface" are used for convenience of explanation, and the content of the present disclosure is not limited to these terms. Any identification unit may be used as long as recording layers are provided on both sides in the thickness direction of optical discs 300 with substrate layer 301 as a center and both surfaces are distinguished.

Optical disc 300 has a guide groove for recording information on each recording layer in L0 layer 302, L1 layer 303, L2 layer 304, L0 layer 305, L1 layer 306, and L2 layer 307. When this guide groove is formed, a surface closer to a side, on which laser light enters, of the A surface side or the B surface side is referred to as a "groove", and a surface distant from the side is referred to as a "land". Information recording density of optical disc 300 can be increased by recording information on both the groove and the land.

Figure 5:
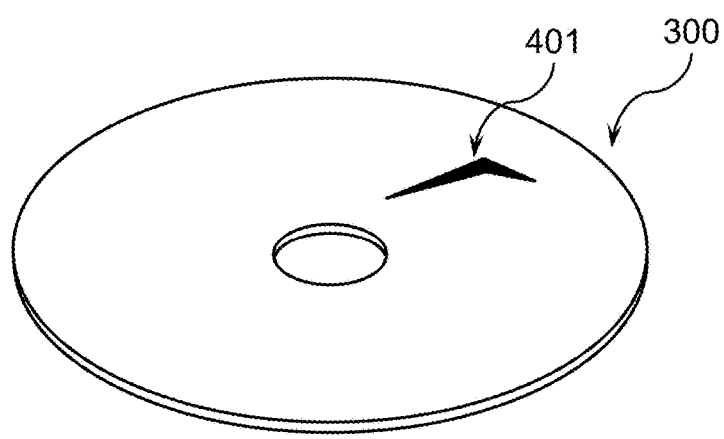
FIG. 5 is a view illustrating an example of an optical disc having a scratch on a recording surface.

FIG. 5 is a view illustrating an example of an optical disc having a scratch on a recording surface. FIG. 5 illustrates a case where there is dust, scratch, etc. 401 on L2 layer 307 located on an outermost on the B surface side of optical disc 300.

When there is a scratch, dust, etc. on a recording layer, on which information is recorded, optical disc apparatus 100 cannot record the information or read the information on or from that portion. More specifically, since a predetermined recording layer of optical disc 300 is not sufficiently irradiated with beam light for recording information on optical disc 300 due to dust, scratch, etc. 401, a recording mark is not correctly formed. Alternatively, beam light for reading information from optical disc 300 is not reflected as expected due to dust, scratch, etc. 401, and reflected light cannot be sufficiently obtained. With this configuration, the information cannot be recorded or read.

Optical disc drive unit 104 irradiates inserted optical disc 300 with laser light. The laser light reflected on optical disc 300 is converted into an electric signal by a photo detector of optical disc drive unit 104. An evaluation value of integrated-maximum likelihood sequence estimation (iMLSE), etc. can be utilized based on a radio frequency (RF) signal generated from this electric signal. The evaluation value is affected by the portion having dust, scratch, etc. 401 on optical disc 300. A state of optical disc 300 can be determined based on this evaluation value.

Note that a method other than the above-described iMLSE may be utilized to detect dust, scratch, etc. 401. For example, an evaluation value based on a symbol error rate (SER) may be used. Further, an evaluation value based on a servo signal, such as a focus error signal or a tracking error signal, acquired in terms of control to optically access optical disc 300, or an evaluation value utilizing an evaluation method, such as black dot out (BDO), may be used. The present disclosure does not disclose a new technique for a specific evaluation method. The content of the present disclosure can be realized by utilizing already-known various evaluation methods.

It is possible to identify a type of error occurred in optical disc 300 by utilizing a plurality of different evaluation methods. For example, it is found that an address signal formed in advance on optical disc 300, such as a pit or a wobble, cannot be acquired by utilizing the evaluation value of the focus error signal or the tracking error signal. Further, although the focus error signal or the tracking error signal can be acquired, other evaluation values may be bad. In this case, it is found that a mark of a signal formed on the optical disc may not be properly formed, quality of a recording layer, on which the mark is formed, may be low, etc. In other words, an outline of a type of error, etc. occurred in optical disc 300 can be acquired by using the evaluation values according to these plurality of evaluation methods.

Further, although timing of evaluation of optical disc 300 is not specified in the present disclosure, there are several evaluation timings. For example, an entire recording surface of new optical disc 300, on which data is not yet recorded, may be evaluated (inspected) once before data recording. Further, in a case where a recording error or a reproduction error occurs when data is recorded on optical disc 300 or when the data is read from optical disc 300, an evaluation value of a portion where the error occurs may be acquired according to a predetermined inspection method. Further, in another example, optical disc 300 may be inserted into optical disc drive unit 104 and inspected upon reception of an instruction from an external host device connected to optical disc apparatus 100.

For example, when unrecorded new optical disc 300 is inserted, optical disc drive unit 104 evaluates all recording areas once before recording data, etc. on optical disc 300. Accordingly, it is possible to determine whether dust, a scratch, etc. on optical disc 300 exists before delivery of optical disc 300 or has occurred after the delivery. Further, optical disc 300 is evaluated when an error occurs during recording or reading data on or from optical disc 300. Accordingly, it is possible to identify a stage at which the dust, scratch, etc. occurs after delivery of optical disc 300. Further, since optical disc 300 is inspected upon reception of the instruction from the host computer, optical disc 300 can be evaluated at any necessary timing. In other words, it is possible to identify timing at which the error occurs in optical disc 300 by inspecting optical disc 300 at various timings.

FIG. 6 is a table illustrating an information example held in storage 121. Information illustrated in FIG. 6 is information about an access result to optical disc 300, or the like, in which controller 120 has acquired from optical disc drive unit 104. Controller 120 holds the information in storage 121. Types of the information and an example of contents of the information held in storage 121 are described below.

Note that a "defect" in the present specification means a case where a physical access to optical disc 300 cannot be normally performed, such as a mark for recording information on optical disc 300 cannot be normally formed, or a mark for reading information from optical disc 300 cannot be normally identified. A meaning of the "defect" is different from a meaning of "defect" referred to as a "defect cluster", etc. where data cannot be normally recorded/read in cluster units that utilizes an error correcting code (ECC) in a technical field of optical disc 300. When the inventor intends to use "defect" in units of a predetermined cluster, etc. using the ECC, etc. in the present specification, the "defect" is separately and explicitly described as the "defect cluster", thereby distinguishing the "defects".

Information acquisition date 501 is information of a date and a time when controller 120 or optical disc drive unit 104 evaluates dust, scratch, etc. 401.

Provision of information acquisition date 501 allows an analyst of the information to concretely specify when optical disc 300 is evaluated.

Optical disc apparatus identifier 502 is information for identifying optical disc apparatus 100 provided with optical disc drive unit 104 that has evaluated optical disc 300. The information for identifying optical disc apparatus 100 includes, for example, both a product number and a serial number of optical disc apparatus 100.

Provision of optical disc apparatus identifier 502 allows the analyst of the information to concretely specify optical disc apparatus 100 that has evaluated optical disc 300.

Magazine type 503 is information for identifying a type of magazine 102 that has stored evaluated optical disc 300. Specifically, a product number, etc. of magazine 102 can be utilized as this information.

Magazine type 503 can specify a maximum number of optical discs 300 that can be held. Further, this information can specify the type of magazine 102 that has housed evaluated optical disc 300.

Magazine identifier 504 is information for identifying this magazine 102. For example, a serial number, etc. of each magazine 102 can be utilized as this information.

By utilizing above-described magazine type 503 and magazine identifier 504, it is possible to uniquely specify magazine 102 that has housed evaluated optical disc 300.

Magazine storage position 505 is information indicating a position where magazine 102 that has stored evaluated optical disc 300 is stored in magazine stocker 101 illustrated in FIG. 1, for example.

With this information, it is possible to specify a position of magazine stocker 101 that actually stores magazine 102 that has stored evaluated optical disc 300.

Number of optical discs 506 is information indicating a number of optical discs 300 actually housed in same magazine 102 as evaluated optical disc 300. This information can be acquired as follows. For example, carrier 106 calculates the number of optical discs 300 conveyed from magazine 102, or picker 103 reads a radio frequency identification (RFID) (not illustrated) individually stuck to magazine 102 and holding various information of magazine 102.

Provision of number of optical discs 506 allows the analyst of the information to specify how many optical discs 300 are actually housed in magazine 102.

Optical disc type 507 to NoY defect position (DP) (logical position) 517 in FIG. 6 described below is information about first optical disc 300 housed in magazine 102.

Optical disc type 507 is information indicating a type of first optical disc 300. If there is a product number, etc., the product number etc. may be used as the information. Single-sided recording/double-sided recording, etc., a number of recording layers, a recording system (for example, recording on the land, recording on the groove, or recording on both the land and the groove), and a recording capacity, etc. are different depending on the types of optical disc 300. Optical disc type 507 is information for identifying these types.

Provision of optical disc type 507 allows the analyst of the information to specify the type of evaluated optical disc 300.

Optical disc identifier 508 is information identifying individual optical disc 300. For example, a serial number of optical disc 300 can be used as the present information. Since the serial number, etc. of optical disc 300 is generally recorded on a burst cutting area (BCA) of optical disc 300, the serial number, etc. can be acquired by reading this area by optical disc drive unit 104.

Provision of optical disc identifier 508 allows the analyst of the information to specify an individual of evaluated optical disc 300.

Insertion drive identifier 509 is information specifying optical disc drive unit 104, into which evaluated optical disc 300 has been inserted. Optical disc apparatus 100 illustrated in FIG. 1 includes the plurality of optical disc drive units 104.

When optical disc apparatus 100 includes the plurality of optical disc drive units 104 and the like, insertion drive identifier 509 can specify optical disc drive unit 104 that has evaluated optical disc 300.

Number of defects 510 is information indicating a number of defects detected in same optical disc 300. Number of defects 510 is information indicating a number of defects detected on optical disc 300 by optical disc drive unit 104, into which optical disc 300 has been inserted. Optical disc drive unit 104 may specify the information of this number of defects 510 by inspecting all the recording areas of optical disc 300. Further, in another method, optical disc drive unit 104 may specify, as number of defects 510, only a total number of defects that can be detected when executing access to a recording area instructed from controller 120, etc.

Provision of number of defects 510 allows the analyst of the information to specify how many defects are recognized on one optical disc 300.

In general, when there is a defect in the recording area of optical disc 300, information to be originally recorded in the defective area is alternatively recorded on another recording area. This area, on which information is alternatively recorded, is referred to as an alternative area. The alternative area is prepared in optical disc 300 in advance. Alternative area residual quantity 511 is information indicating an available residual quantity of the alternative area provided in advance.

Provision of alternative area residual quantity 511 allows the analyst of the information to grasp the residual quantity of the alternative area provided in optical disc 300. Alternative area residual quantity 511 indicates how much more optical disc 300 can cope with a defect.

No1 defect position (DP) (physical position) 512 to NoY defect position (DP) (logical position) 517 indicate detailed information about each of Y defects indicated by number of defects 510 recognized on first optical disc 300 housed in magazine 102.

No1 defect position (physical position) 512 is information indicating a physical position on optical disc 300 of a first defect detected on first optical disc 300. For example, the information indicating the physical position may be a physical address uniquely set at a recording position in each recording area of each optical disc 300. When the physical address is specified, a position on optical disc 300 corresponding to the physical address can be specified.

Further, besides the physical address, the information may utilize other position specification that utilizes physical configuration information. The physical configuration information includes recording surface information indicating the recording surface on either the A surface side or the B surface side, recording layer information indicating any of the L0 to L2 layers, groove information specifying the land or the groove, radius information indicating a track position, or phase angle information indicating a sector position. The information is utilized to control a module, such as an optical pickup, when optical disc drive unit 104 accesses optical disc 300.

Provision of No1 defect position (physical position) 512 allows the analyst of the information to specify the position of the defect occurred on optical disc 300.

No1 defect position (logical position) 513 is information indicating a position on optical disc 300 of the first defect detected on first optical disc 300, similarly to No1 defect position (physical position) 512. No1 defect position (logical position) 513 is different from No1 defect position (physical position) 512 in that positional information is indicated as logical positional information.

When a positional information of the recording area of optical disc 300 is indicated as the logical positional information, the recording area of optical disc 300 is regarded as one continuous logical space, and a logical address uniquely allocated within the logical space and, if necessary, information of the alternative area are utilized. With this configuration, the position of the defect on optical disc 300 is specified.

Provision of No1 defect position (logical position) 513 allows the analyst of the information to specify the position of the defect occurred on optical disc 300, similarly to No1 defect position (physical position) 512.

Note that in the present exemplary embodiment, a case where both No1 defect position (physical position) 512 and No1 defect position (logical position) 513 are obtained is illustrated. However, the content described in the present disclosure is not limited to this case. Only either one of the information may be utilized.

A main purpose in the above-described example is to record only a defective portion. However, the content of the present disclosure is not limited to recording of the defective portion. For example, when a defect is detected on one of a groove track and a land track, inspection may also be performed on another of the land track and the groove track adjacent to the one track in a radial direction, thereby recording information of an inspection result together.

Similarly, for example, when a defect is detected in the L0 layer, inspection may also be performed on a portion corresponding to a substantially same radius or phase angle position as a defect position in the L0 layer of the recording layer, such as the L1 layer or the L2 layer, located further on a side where laser light enters than the recording layer having the defect, thereby recording information of an inspection result together.

In this way, analysis can be performed in more detail by inspecting and recording not only the defect portion but also the portion having high relevance in configuration, such as a surrounding portion of the defect.

No2 defect position (physical position) 514 and No2 defect position (logical position) 515 indicate positional information of a second defect on first optical disc 300 housed in magazine 102, similarly to No1 defect position (physical position) 512 and No1 defect position (logical position) 513. Because details are similar to No1 defect position (physical position) 512 and No1 defect position (logical position) 513, description of No2 defect position (physical position) 514 and No2 defect position (logical position) 515 is omitted.

A defect position of each of Y defects indicated by number of defects 510 can be similarly indicated by using a physical position and a logical position.

Further, when second and subsequent optical discs 300 housed in magazine 102 are evaluated, information can also be recorded in a same manner as above-described optical disc type 507 to NoY defect position (logical position) 517. Note that an ordinal number, such as first or second, is based on a stacking order of optical discs 300 in magazine 102. Specifically, optical discs 300 stacked in magazine 102 respectively have unique serial numbers from top to bottom. With this configuration, it is possible to specify the position of optical disc 300 housed in magazine 102.

In the example in FIG. 6, the information of the optical disc housing position indicating the position of each optical disc 300 in magazine 102 can be determined from a relation among the plurality information items recorded in storage 121. However, the present exemplary embodiment is not limited to this content. The information of the optical disc housing position indicating the position of optical disc 300 in magazine 102 may be directly indicated.

FIG. 6 illustrates the information recording system that has evaluated optical disc 300 housed in magazine 102 with magazine 102 as a management unit. However, the content described in the present disclosure is not limited to this system. The information evaluating optical disc 300 may be recorded with optical disc 300 as a unit. In this case, a content illustrated in FIG. 7 is an example. Same reference marks are assigned to items that are same as those in FIG. 6, and detailed description of the items is omitted.

Optical disc storage position 605 is information newly included in FIG. 7. Optical disc storage position 605 is information indicating a position of evaluated optical disc 300 in optical disc apparatus 100. For example, there is a method in which this information includes identification information of magazine 102 that houses evaluated optical disc 300, positional information indicating a position of optical disc 300 in magazine 102, and further, positional information indicating a position of magazine 102 in magazine stocker 101. Further, as another example, there is a method in which an identification number corresponding to a housing position is uniquely allocated to each of all optical discs 300 in optical disc apparatus 100 and a storage position is specified by the identification number.

The information recorded and stored in storage 121 is not limited to the information illustrated in FIG. 6 or 7. For example, as with alternative area residual quantity 511, if a number of alternative defect clusters, etc. is known from a size of a first allocated alternative area of optical disc 300, information corresponding to alternative area residual quantity 511 can be calculated. In case of acquiring such information, it is not necessary to record, store, etc. the entire information illustrated in FIG. 6, 7, and the like in storage 121. If identical information can be calculated based on the other information, it is not necessary to include the identical information in the information recorded, stored, etc. in storage 121.

Further, the method for recording the position of the defect detected on evaluated optical disc 300, etc. is described in the example in FIG. 6 or 7. However, the content described in the present disclosure is not limited to this method. For example, when all of unrecorded optical discs 300 are inspected, all evaluation values (for example, an optical access result, such as a size of a light reception signal) acquired from all inspected areas may be recorded. By recording results of all the inspected areas in this way, it is possible to grasp overall conditions of optical discs 300.

Further, the case of directly recording the defect position is illustrated in the example in FIG. 6 or 7. However, the content described in the present disclosure is not limited to this case. For example, when evaluation is performed on a specific area according to a predetermined rule determined in advance of the recording area, on which data is recorded, each position on optical disc 300 can be relatively identified by recording evaluation values sequentially acquired from a head of the specific area. Accordingly, each position may be indirectly specified in this way.

Herein, "the specific area according to the predetermined rule determined in advance" is, for example, a track spaced every m track from an nth track serving as a base point. When processing time becomes long upon evaluation of all of the recording areas, the evaluation may be limited to an area extracted from among the recording areas based on a certain rule, etc.

The above-described two examples are more effective in evaluating entire data recording areas of optical discs 300, particularly when unrecorded optical discs 300 are inserted into optical disc drive unit 104.

Further, the method for recording the defect position is described in the example in FIG. 6 or 7. However, the content described in the present disclosure is not limited to this method. For example, not only the defect position, but also the evaluation value serving as an optical access result at the defect position may be recorded. With this configuration, it is possible to identify strength and weakness of the defect, etc. The above-described various evaluation values can be employed as this access result. Specifically, there are an iMLSE based on an RF signal, an evaluation value based on an SER, an evaluation value based on a servo signal, such as a focus error signal or a tracking error signal, an evaluation value utilizing an evaluation method, such as a BDO, a size of a light reception signal, and the like. One or more evaluation values may be recorded in storage 121 as the access result.

As described above, controller 120 stores, in storage 121, the information, such as the defect and the access result, acquired from optical disc drive unit 104 that optically gained access to optical disc 300. Controller 120 performs processing for transmitting the information stored in storage 121 to the analysis device that analyzes the information. There are several methods in this processing according to a condition where optical disc apparatus 100 is used.

When optical disc apparatus 100 can electronically transmit the information stored in storage 121 to the analysis device through a communication line or the like, controller 120 converts the information stored in storage 121 into a predetermined format, etc. and transmits the format to a specified analysis device, etc. as electronic information. In this case, before transmitting the information, a request for confirmation about transmission of the information may be displayed on the display of optical disc apparatus 100 as needed.

Further, in another example, when optical disc apparatus 100 cannot electronically transmit the above-described information to a person in charge of analysis through a communication line, etc., controller 120 can notify to a user of optical disc apparatus 100 via the display that information to be transmitted to storage 121 is stored. Controller 120 may perform processing called encryption processing so that a third party cannot easily read the information stored in storage 121 or compression processing to reduce a file size of information.

The information subjected to the encryption processing, the compression processing, or the other predetermined processing is copied to transportable storage mediums, etc., and then transmitted to the analysis device by connecting the storage mediums to the analysis device. In this case, optical disc apparatus 100 outputs the information subjected to the predetermined processing to these storage mediums.

FIG. 8 is a table illustrating an output example displayed by the analysis device. The analysis device clearly displays defects, etc. of optical disc 300 based on the information acquired from optical disc apparatus 100. Specifically, display according to each defect position or shape is performed using a shape of optical disc 300 as a base. At that time, a size or a color of each display may be changed according to a size of a defect, an amount of an error occurred, or a defect content.

Further, optical disc 300 described in the present exemplary embodiment is capable of recording information on both the surfaces, and each of the surfaces has the plurality of recording layers. Accordingly, in the output example by the analysis device, it is preferable that defects be individually displayed for every recording surface and recording layer so that positional relations of the recording surfaces and the recording layers are easily understood. In the example in FIG. 8, defects recognized on the different recording surfaces and recording layers of same optical disc 300 are displayed in a lateral direction.

Further, when optical disc 300 serving as an inspection object includes a plurality of recording layers, the analysis device may automatically adjust phase angles of the recording layers. For example, when dirt, dust, etc. is attached to L2 layer 304, 307 located closest to the side where the laser light enters, a defect may also be detected on a corresponding portion of the other recording layer located inside. In this case, it is preferable that the analysis device display the result in FIG. 8 and the like by adjusting phase relations (positional relations in a rotating direction) of the recording layers. Such adjustment can be performed by, for example, the technique described in PTL 1, or pattern matching of defect shapes illustrated in the results detected on the recording layers. The analysis device may include a function of displaying the defects for every recording layer in a superposing manner and further adjusting display angles of the recording layers so that a user can adjust the phase relations.

Further, in the example in FIG. 8, defect positions on recording surfaces and recording layers of other optical discs 300 included in same magazine 102 are marked in a longitudinal direction from the information acquired in a same manner.

Since the analysis device performs such display, it is easy to grasp the defects on the recording surfaces and recording layers of optical discs 300 housed in units of magazine. This display method is useful particularly when there is dust, a scratch, etc. in association with a housing position, etc. of optical disc 300.

For example, defects having similar shapes are detected at substantially same positions on adjoining recording surfaces of two optical discs 300 housed adjacently in same magazine 102. In this case, it can be assumed that a possibility that dust, etc. is sandwiched between two optical discs 300 is high.

Note that the present exemplary embodiment mainly describes a case where controller 120 acquires the information about evaluated optical disc 300 from optical disc drive unit 104 and stores the information in storage 121. However, the content of the present disclosure is not limited to this case.

For example, when a defect, etc. is found on one optical disc 300 of the plurality of optical discs 300 included in certain magazine 102, other discs 300 included in same magazine 102 may also be evaluated to acquire the information. In this case, when a defect cannot be detected on other discs 300, for example, optical disc 300 having no defect can be clearly displayed by setting defect number 510 of optical disc 300 described in FIG. 6 at "0".

The above-described case is particularly useful when the plurality of optical discs 300 in magazine 102 constitute redundant arrays of inexpensive discs (RAID). Since information is distributed into the plurality of optical discs 300 and recorded redundantly in the RAID, it is preferable that information of a defect be managed by all the plurality of optical discs 300 constituting the RAID.

Note that, when optical disc apparatus 100 stores the plurality of magazines 102 in magazine stocker 101 as illustrated in FIG. 1, the information acquired/stored by controller 120, etc. in FIG. 6 may further include information of a magazine storage position indicating a position of magazine 102 stored in magazine stocker 101.

The storage position of target magazine 102 can be specified by including the information of the magazine storage position.

A technical content described in the present disclosure can be used by an optical disc apparatus that records information on an optical disc.

What is claimed is:

1. An optical disc apparatus comprising:
a controller configured to acquire information of an access result indicating a result of an optical access by an optical disc drive unit to an optical disc and information of an access position indicating a position of the optical access on the optical disc; and
a storage configured to store the information acquired by the controller, wherein
when an error occurs in an optical access to a certain recording layer of the optical disc, the controller further acquires information of an access result indicating a result of an optical access to another recording layer,
a portion of the another recording layer, to which the controller acquires information of the access result indicating the result of the optical access, is corresponding to a substantially same radius or phase angle position as a position where the error occurred, and
the controller acquires information of the access result without recording data.

2. The optical disc apparatus according to claim 1, wherein
the controller further acquires information of an optical disc identifier identifying the optical disc inserted into the optical disc drive unit.

3. The optical disc apparatus according to claim 2, wherein
the optical disc is one of a plurality of optical discs housed in a magazine as a set, and
the controller further acquires information of a magazine identifier identifying the magazine where the optical disc is housed, and information of an optical disc housing position indicating a position of the optical disc in the magazine.

4. The optical disc apparatus according to claim 3, wherein
the controller further acquires information of a magazine storage position indicating a position of the magazine in a magazine stocker.

5. The optical disc apparatus according to claim 2, wherein
the controller further acquires information of an alternative area residual quantity of the optical disc.

6. The optical disc apparatus according to claim 1, wherein
the information of the access positions includes recording surface information indicating a position of a recording surface of the optical disc, recording layer information indicating a position of a recording layer, a track number indicating a track position and a sector number indicating a sector position.

7. The optical disc apparatus according to claim 1, wherein
when an error occurs in an optical access to a certain track of the optical disc, the controller further acquires information of an access result indicating a result of an optical access to one or more neighboring tracks counted by a predetermined number from the track.

\* \* \* \* \*